(12) United States Patent
Craig, Jr.

(10) Patent No.: US 6,178,601 B1
(45) Date of Patent: Jan. 30, 2001

(54) MECHANICAL CONNECTION FOR OPEN CLAMPS

(76) Inventor: Paul M. Craig, Jr., 207 Quaint Acres Dr., Silver Spring, MD (US)

(*) Notice: Under 35 U.S.C. 154(b), the term of this patent shall be extended for 0 days.

(21) Appl. No.: 09/512,296

(22) Filed: Feb. 24, 2000

Related U.S. Application Data

(60) Provisional application No. 60/142,917, filed on Jul. 9, 1999.

(51) Int. Cl.[7] .................................................. F16L 33/025
(52) U.S. Cl. .................. 24/20 R; 24/20 CW; 24/20 TT; 72/324; 72/379.2
(58) Field of Search ............................. 24/20 R, 20 CW, 24/20 EE, 20 TT, 20 W, 23 W; 72/324, 325, 332, 379.2

(56) References Cited

U.S. PATENT DOCUMENTS

| | | | |
|---|---|---|---|
| 3,321,811 | * | 5/1967 | Thomas ................... 24/20 R |
| 4,299,012 | * | 11/1981 | Oetiker ............... 24/20 CW X |
| 4,492,004 | * | 1/1985 | Oetiker ................... 24/20 R |
| 4,622,720 | * | 11/1986 | Oetiker ............... 24/20 CW X |
| 5,274,886 | * | 1/1994 | Oetiker ............... 24/20 R X |
| 5,282,295 | * | 2/1994 | Oetiker ................... 24/20 R |

* cited by examiner

*Primary Examiner*—James R. Brittain

(57) ABSTRACT

This invention relates to so-called open clamps with a mechanical connection of overlapping band portions including a guide hook which is so modified as to minimize reopening of the clamp before it is fully tightened.

25 Claims, 5 Drawing Sheets

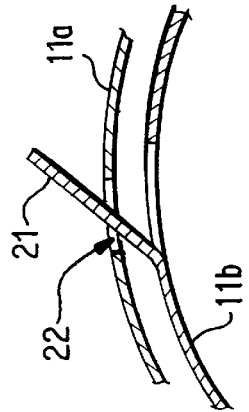
FIG. 2 PRIOR ART
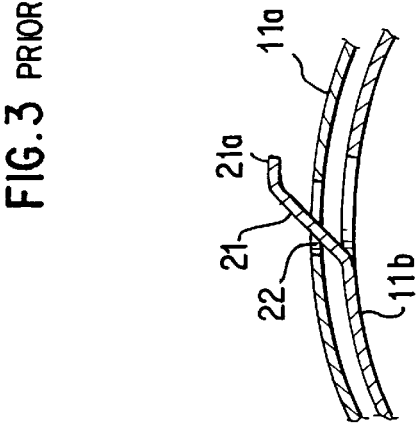
FIG. 3 PRIOR ART
FIG. 5 PRIOR ART
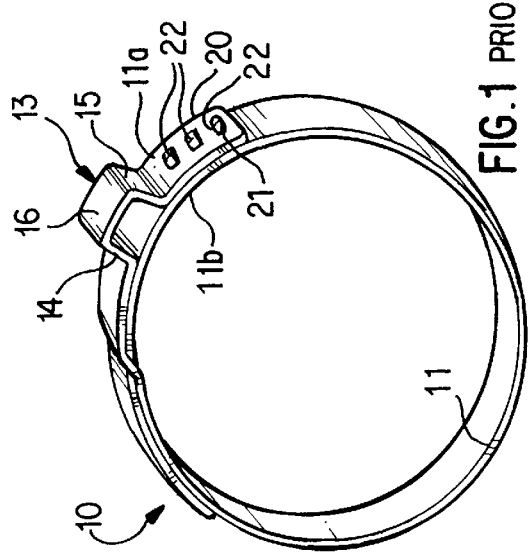
FIG. 1 PRIOR ART
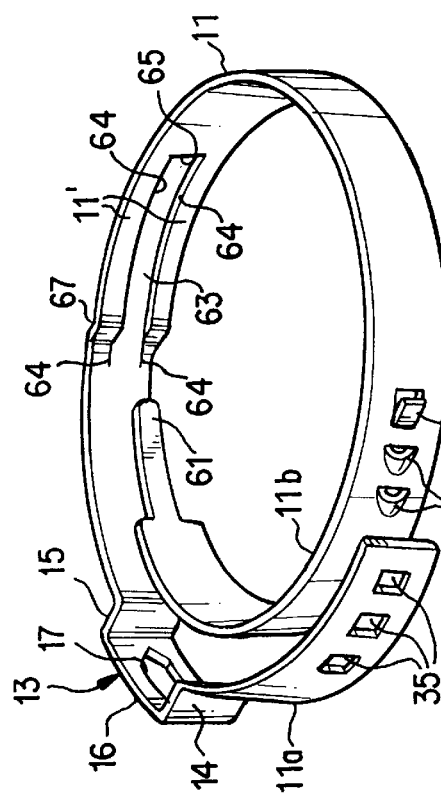
FIG. 4 PRIOR ART

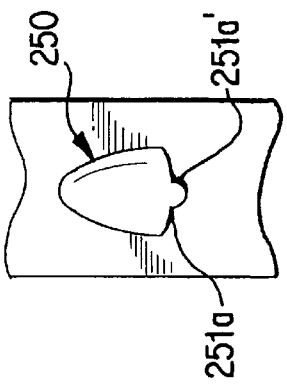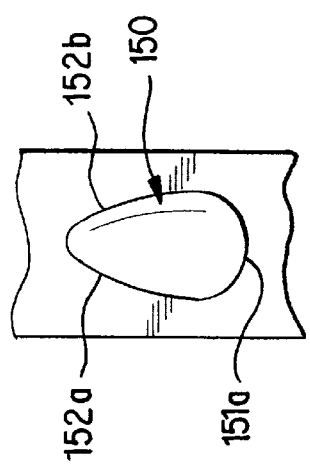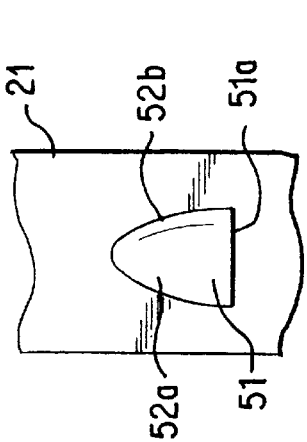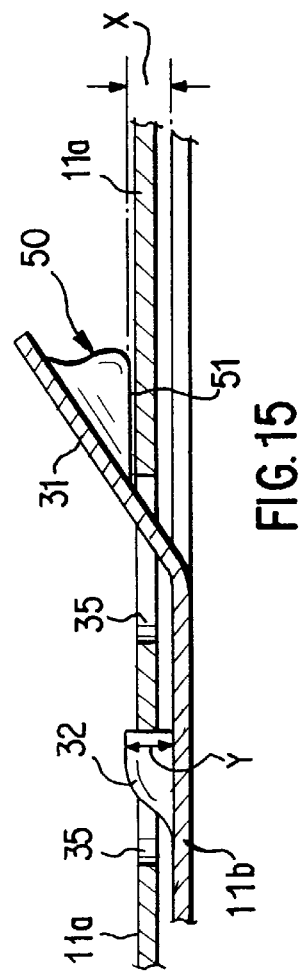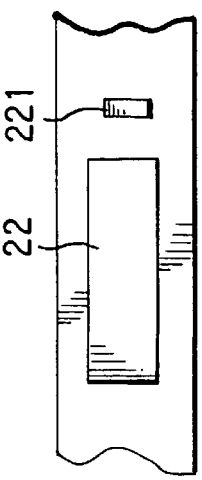

MECHANICAL CONNECTION FOR OPEN CLAMPS

This application claims the benefit of U.S. Provisional Application No. 60/142,917, filed Jul. 9, 1999.

FIELD OF INVENTION

This invention relates to so-called open clamps using a plastically deformable ear for tightening the clamp, and more particularly to a mechanical connection in the overlapping band portions of such clamps with the use of at least one hook performing a guide function in one band portion engaging in at least one aperture in the other band portion.

BACKGROUND OF THE INVENTION

So-called open clamps made from band material, usually galvanized steel or stainless steel, which utilize a plastically deformable "Oetiker" ear for tightening the clamp have been commercially available and highly successful for many years. Before tightening the clamp by plastic deformation of the "Oetiker" ear, the overlapping band portions must be mechanically connected, for example, by spot-welding or preferably by one or more hook-shaped members in the inner of the overlapping band portions engaging in one or more apertures in the outer overlapping band portion. One or more so-called guide hooks, sometimes also called suspension hooks, which are bent out of the clamping band about a transverse axis after a substantially U-shaped cut in the longitudinal direction of the clamping band, have been used for many years for that purpose. FIGS. 1 through 3 illustrate a so-called open clamp with such a guide hook 21 extending obliquely outwardly from the inner band portion 11b and engaging in one of several apertures 22 in the overlapping outer clamping band portion 11a, as disclosed in U.S. Pat. No. 3,321,811. Though the present invention is theoretically applicable to any tightening device which requires a mechanical connection before tightening can be commenced, it is of particular significance and advantage when used with open clamps that are tightened by plastic deformation of a so-called "Oetiker" ear generally designated in FIG. 1 by reference numeral 13 and consisting of generally outwardly extending parallel leg portions 14 and 15 interconnected by a bridging portion 16, normally provided with a reinforcing groove or pan-shaped depression (not shown) as described, for example, in U.S. Pat. No. 5,282,205. The problem encountered with the prior art mechanical connections using only one such guide hook 21 was the likelihood of reopening of the mechanical connection in the course of the application of tightening forces which cause the hook 21 to bend back into a clamp re-opening position 21' (FIG. 3). To reduce the likelihood of reopening of the clamp owing to a bent-back guide hook, a combination of a guide hook 31 and deep-drawn support hook(s) 32 was proposed for such clamps in U.S. Pat. No. 4,299,012, whereby upon application of tightening forces by plastic deformation of the ear 13, the outer band portion 11a, guided along the inclined surface of the guide hook 31, would be drawn toward the inner band portion 11b to assure engagement of support hooks 32 in their apertures 35 (FIG. 4). In turn, this permits improved absorption of the higher tightening forces by the support hooks. This prior art arrangement proved highly successful. Nonetheless, if the speed of the increase of the tightening forces, for example, with the use of pneumatic tools, exceeds a certain value, depending also on clamping band material, thickness of the clamping band and length of the guide hook determining the lever arm, it may happen that the guide hook bends back before the overlapping band portions have come close enough to one another to cause engagement of the support hooks in their respective apertures.

Such open clamps are made from flat steel band material and are usually deformed into more or less circular shape to facilitate installation over the hose and engagement of the guide hook in its aperture before tightening can be commenced by plastic deformation of the "Oetiker" ear. However, such predeformation is likely to cause spring stresses to be set up in the clamping band which seek to return the clamping band to a more straight configuration, i.e., seek to reopen the clamp by disengagement of the outer band portion 11a from the guide hook. Thus another preexisting problem was the likelihood of reopening when the outer band portion 11a slides again outwardly over the edge of the free end of the guide hook under the spring forces. This danger is the greater the shorter the guide hook. On the other hand, the longer the guide hook, the greater the lever arm seeking to bend the hook into the guide-hook reopening position. To counteract these contradictory effects, it has been proposed heretofore to bend the free end of the guide hook as shown at 21a in FIG. 5. This improves the problem but does not completely eliminate the same.

SUMMARY OF THE INVENTION

The present invention proposes to obviate the aforementioned problems of the prior art by providing in the guide hook an abutment surface which effectively prevents reopening of the mechanical connection by stopping the outer band portion provided with the hook-engaging aperture from sliding out over the free edge of the guide hook and which at the same time assures with greater certainty the early and timely absorption of the tightening forces by the support hook(s). The abutment surface may thereby be formed in any known manner, for example, by cold-deformation and deep-drawing or by bending, whereby the abutment surface extends at least approximately parallel to the longitudinal direction of the outer clamping band, preferably substantially coplanar with the longitudinal direction of the outer clamping band portion. In a preferred embodiment, the abutment surface is formed directly in the guide hook by a double-bending of the hook so that a section of predetermined length extends at least approximately parallel to the longitudinal direction of the outer clamping band in its preassembled condition, i.e., with the guide hook engaging its aperture before tightening.

The abutment surface facing the outer band portion in accordance with this invention is thereby preferably located at such a radial distance from the outer surface of the inner band portion that at the beginning of the tightening of the clamp, the support hooks are able to engage immediately into force-absorbing engagement in their apertures or already are in such a position. This can be realized by making this radial distance between the abutment surface and the outer surface of the inner band portion at least slightly larger than the thickness of the clamping band but smaller than the height of the support hook. As the outer band portion is slipped over the guide hook in the inward direction during preassembly, it will reach a position where the edge of the aperture for the guide hook, which is nearer the free end of the outer band portion, can slide under the abutment surface, thereby establishing the desired preassembly.

This preassembly must not be confused with the prior art preassembly in so-called earless clamps as exemplified by U.S. Pat. No. 4,492,004 (FIG. 6) and U.S. Pat. No. 5,274,886 (FIG. 7) which involve completely different structures, functions and purposes from those of the present invention. Whereas in the open clamps with "Oetiker" ears as tightening means, a mechanical connection between overlapping band portions must be established before tightening of the clamp can be started by plastic deformation of the ear, in these so-called earless clamps, no mechanical connection is required nor possible until the clamp has been fully tightened to the point where it has reached the predetermined final clamping force, at which time only the hooks in the inner band portion can engage in the correspondingly located apertures in the outer band portions. Stated differently, in the open clamps to which the invention applies, the initial diameter of the clamp is determined by the circumferential length of the clamping band from the mechanical connection by way of the ear circumferentially again to the mechanical connection thereby including the length of the gap under the ear. Tightening is achieved by reducing the length of this gap during plastic deformation of the ear. By contrast, in the so-called earless clamps, tightening is achieved by relative movement of freely movable tool-engaging embossments toward one another. This free movability is a prerequisite to permit the tool-engaging embossments 124 and 125 of FIGS. 6 and 7 to move toward one another until the predetermined clamping force is reached, at which time the support hooks 132 are able to engage in their respective apertures. The pre-assembly hook 128 in FIG. 6 as also the snap-in preassembly hook 143 in FIG. 7 merely serve to hold the overlapping clamping band portions in place to facilitate the engagement of the tightening tool in the tool-engaging embossments in order to free both hands for this task, previously requiring one hand to hold the overlapping clamping band portions in proper position. However, as the tightening force is applied and the tool-engaging embossments 124 and 125 move toward one another, the preassembly hooks 128 and 143 become disengaged again long before the full clamping force is reached. By contrast, in the present invention, the preassembly position is enhanced with the application of tightening forces by plastic deformation of the ear and is thus preserved during the entire tightening operation.

BRIEF DESCRIPTION OF THE DRAWINGS

These and other objects, features and advantages of the present invention will become more apparent from the following description, when taken in connection with the accompanying drawing which shows, for purposes of illustration only, several embodiments in accordance with the present invention and wherein:

FIG. 1 is a perspective view of a prior art clamp with a plastically deformable "Oetiker" ear and with a mechanical connection utilizing a so-called guide hook;

FIG. 2 is a somewhat schematic partial cross-sectional view on an enlarged scale through a prior art clamp similar to FIG. 1 and showing the position of the guide hook engaging in an aperture of the outer band portion in the non-tightened preassembled condition;

FIG. 3 is a partial cross-sectional view through the clamp of FIG. 1 and illustrating the clamp re-opening position 21' of the mechanical connection when the guide hook is bent back by tightening forces;

FIG. 4 is a perspective view of a prior art clamp with an "Oetiker" ear and with a guide hook and two support hooks as disclosed in the U.S. Pat, No. 4,299,012;

FIG. 5 is a partial cross-sectional view, similar to FIG. 2, and illustrating a modified shape of the guide hook to prevent re-opening of the clamp as used in the prior art;

FIG. 11 is a partial, somewhat schematic bottom plan view, on an enlarged scale, on the abutment surface of one embodiment of a guide hook in accordance with this invention;

FIG. 12 is a partial somewhat schematic bottom plan view, similar to FIG. 11, showing a modified embodiment of an abutment surface in accordance with this invention;

FIG. 13 is a partial, somewhat schematic bottom plan view, similar to FIGS. 11 and 12 showing a still further modified embodiment of an abutment surface in accordance with this invention;

FIG. 14 is a partial plan view on the outer band portion provided with an indentation or slot for use with an abutment surface as shown in FIG. 13 to permit anchoring of the abutment surface;

FIG. 15 is a somewhat schematic cross-sectional view, on an enlarged scale, illustrating a mechanical connection as shown in FIG. 4 with an abutment surface on the guide hook in accordance with this invention and with the parts in the not-yet-tightened preassembly condition;

DETAILED DESCRIPTION OF THE INVENTION

Figure 6:
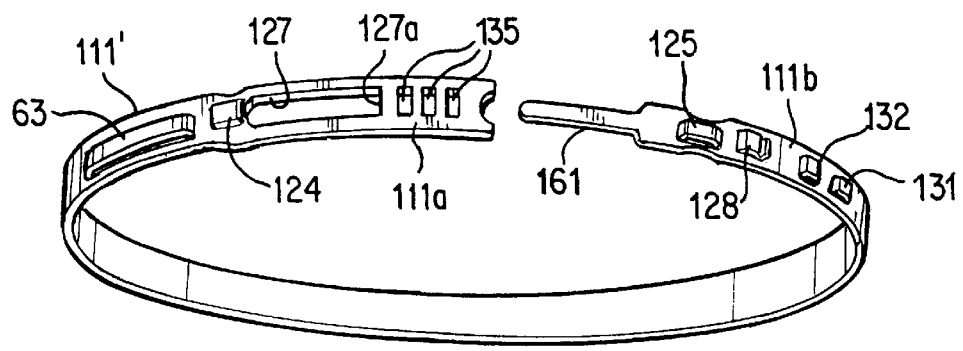
FIG. 6 is a perspective view of a so-called earless clamp as disclosed in U.S. Pat. No. 4,492,004.
Figure 7:
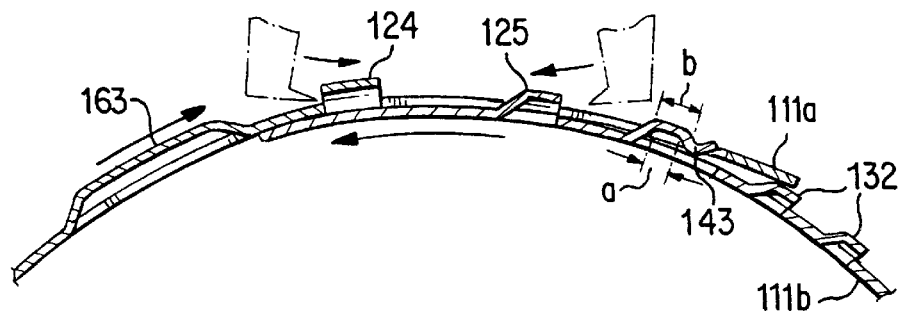
FIG. 7 is a partial cross-sectional view of a modified embodiment of a so-called earless clamp as disclosed in U.S. Pat. No. 5,274,886.

Referring now to the drawing wherein similar reference numerals are used throughout the various views to designate corresponding parts, FIGS. 1, 2 and 3 illustrate a prior art clamp with one so-called guide hook 21 in an inner band portion 11b adapted to engage in one of several apertures 22 in the outer band portion 11a of a clamping band 11 made from any suitable material such as galvanized or stainless steel. The clamp of FIGS. 1–3 includes a tightening means in the form of a so-called "Oetiker" ear generally designated by reference numeral 13, including two parallel outwardly extending leg portions 14 and 15 interconnected by a bridging portion 16 and connected at their inner ends with the clamping band 11. The bridging portion is thereby preferably provided with a reinforcing groove or pan-shaped depression (not shown) as known in the prior art.

FIG. 2 illustrates the position of the guide hook 21 in aperture 22 of the outer clamping band portion 11a, preassembled before tightening by plastic deformation of the "Oetiker" ear 13, whereby the inherent springiness of the pre-deformed band material seeks to move the outer band portion 11a toward the free end of the guide hook 21.

FIG. 3 illustrates the problem with the guide hook 21 of FIGS. 1 and 2 owing to its likelihood of being bent back into a clamp re-opening position 21' by tightening forces. This tendency is the greater the longer the guide hook and the thinner the clamping band material and the greater the lever arm at the point of the force application.

FIG. 4 illustrates a clamp as disclosed in U.S. Pat. No. 4,299,012 which uses an arrangement of a mechanical connection with one guide hook 31 and two-cold deformed, deep-drawn support hooks 32 intended to avoid the aforementioned bent-back re-opening problem. Additionally, the clamp of this patent also assures a stepless, gap-free internal clamping surface by the use of a narrow tongue-like extension 61 adapted to extend through an opening provided in the step-like portion 67 of the outer band portion 11a.

FIG. 5 illustrates a prior art guide hook 21 (or 31) whose free end is bent off at 21a to reduce the danger of reopening caused by the outer band portion 11a sliding over the end of the guide hook due to inherent spring stress in the pre-deformed clamping band. However, even such bending of the free end is not completely failure proof. The length of the guide hook 21 or 31 is thereby so chosen as to compromise the mutually contradictory problems arising from excessively short and excessively long guide hooks. In the former case, the likelihood of reopening is increased owing to an ease of the outer band portion sliding again over the edge of the free end of the guide hook while in the latter case the likelihood of bending-back of the guide hook before effective engagement of the support hook is increased owing to the greater lever arm.

Figure 8:
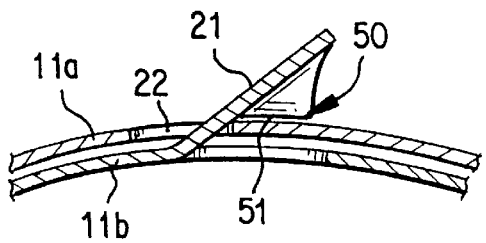
FIG. 8 is a somewhat schematic partial cross-sectional view, similar to FIG. 5, taken again at right angle to the axial direction of a clamp, with a guide hook provided with an abutment surface in accordance with this invention.
Figure 9:
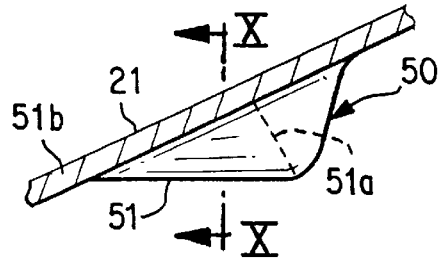
FIG. 9 is a somewhat schematic elevational view, similar to FIG. 8, but on an enlarged scale and showing a guide hook with a cold-deformed, deep-drawn abutment surface according to this invention.
Figure 10:
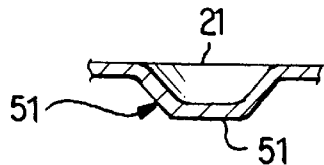
FIG. 10 is a somewhat schematic cross-sectional view, also on an enlarged scale, taken along line X—X of FIG. 9.

This invention therefore seeks to provide a guide hook which avoids the aforementioned problems in a simple and inexpensive manner that is readily adapted to mass-production techniques and does not require extensive retooling. This is achieved in one embodiment of this invention by a cold-deformed, deep-drawn abutment part generally designated by reference numeral 50 (FIG. 8) which provides an abutment surface 51 of more or less planar configuration against which the outer band end portion 11a will come to rest as a result of the inherent elastic force in the clamping band due to the bending thereof from its flat condition into its more or less circular predeformed position. The size of the aperture 22 in the outer band portion 11a is thereby chosen large enough so that the guide hook 21 with its abutment part 50 can extend therethrough. The inherent springiness of the band material will then cause the outer band portion 11a to engage the abutment surface 51 from below which thus blocks any outward sliding movement of the outer band portion and thereby prevents reopening of the clamp. The abutment part 50 may thereby be realized in any known manner, for example, by deep-drawing. In the embodiment of FIG. 11, also shown in dash-lines 51a in FIG. 9, a single rectilinear cut 51a (FIG. 11) is made to facilitate deep-drawing before deep-drawing is commenced whereby the remaining parts 52a and 52b of the abutment part 50 remain integral with the guide hook 21 to strengthen the part 50 and to minimize unwanted change in shape. The abutment part 50 may thereby be made by deep-drawing in a manner similar to the support hook described in U.S. Pat. No. 4,299,012. The abutment surface 51 is thereby preferably at least partially planar at least approximately parallel to the outer surface of the outer band portion 11a. If necessary, the guide hook 21 may be bent in either direction about an area 51b (FIG. 9) as required to achieve a substantially parallel position of the abutment surface 51. Additionally, the outer end portion of the guide hook 21 may also be bent back as shown in FIG. 5 to provide an additional protection against unwanted re-opening of the clamp if the preassembly position by means of the abutment surface 51 should unexpectedly fail. This is also applicable to the other embodiments of this invention.

FIG. 12 shows a modified embodiment of the abutment part 150 in which the cut 151a is curvilinear to provide an abutment surface of desired configuration.

FIG. 13 illustrates a further embodiment of the abutment part 250 in which the transverse cut may be either rectilinear or more or less curved and is provided with a projection 251a for anchoring the abutment part in an indentation or notch 221 illustrated in FIG. 14.

As mentioned above, to eliminate the problem of reopening of the clamp as a result of bending back of the guide hook in the presence of large tightening forces, U.S. Pat. No. 4,299,012 (FIG. 4) proposed the use of a conventional guide hook 31 in combination with one or more cold-deformed, deep-drawn support hooks 32 whereby interaction between the guide hook 31 and the edge of the corresponding aperture 35 in the outer band portion 11a causes the overlapping band portions 11a and 11b to be drawn toward one another during tightening of the clamp to thereby enhance engagement of the support hooks 32 in their respective apertures 35. Though this patent did not otherwise address the problems of this invention, in practice, in commercially available clamps using the invention of this patent, the free end of the guide hook 31 was bent back (FIG. 5) in due course to reduce the danger of reopening.

The provision of an abutment surface 51 in accordance with this invention is particularly advantageous with the type of mechanical connection utilizing a combination of guide and support hooks because the abutment surface 51, as shown in FIG. 15, can be so located on the guide hook 31 that the outer band portion 11a in engagement with the abutment surface 51 is already in such a preassembly position that the support hook(s) 32 extends above the edge of the corresponding aperture(s) 35 to assure engagement of the outer band portion with the support hook(s) 32 when tightening is commenced even without any drawing together of the band portions as proposed in the aforementioned U.S. patent. In other words, the abutment surface 51 holds the two band portions 11a and 11b in such a position that already at the beginning of the application of any tightening forces, the outer band portion 11a is in a position to reliably engage with the support hook 32 to assist in absorbing already from the beginning of the tightening operation any occurring forces. The distance X between the abutment surface 51 and the outer surface of the inner band portion 11b must therefore be at least slightly larger than the thickness of the clamping band and preferably less than the height Y of the support hook 23.

Figure 16:
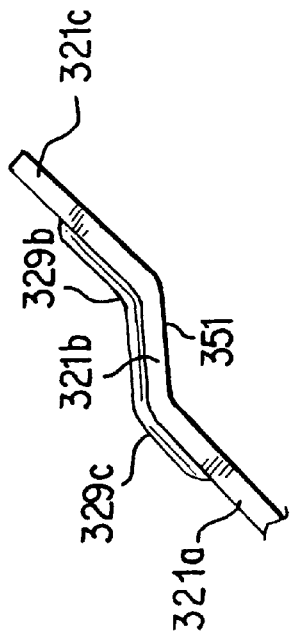
FIG. 16 is a partial somewhat schematic cross-sectional view showing one preferred embodiment of a guide hook in accordance with this invention whose free end may also be bent back.
Figure 17:
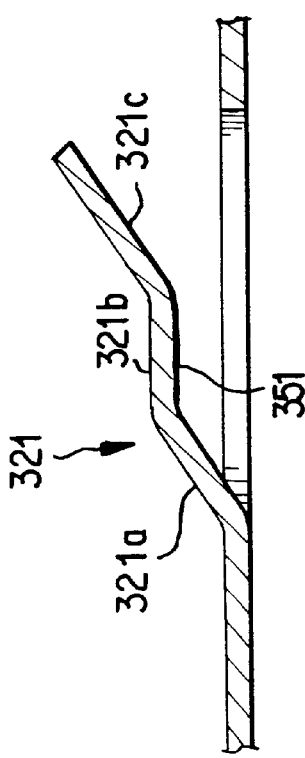
FIG. 17 is a partial somewhat schematic side elevational view of a modified preferred embodiment of a guide hook similar to FIG. 16 but provided with reinforcements in accordance with this invention.
Figure 18:
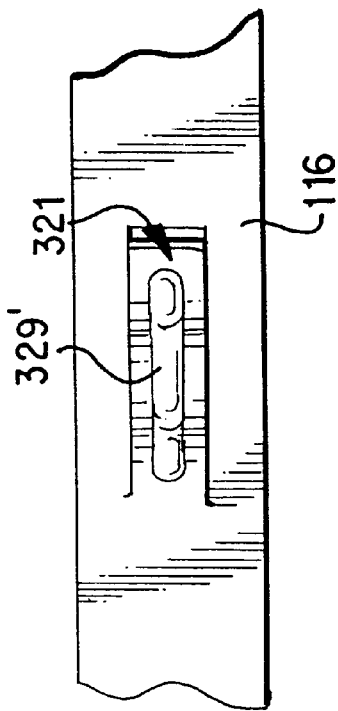
FIG. 18 is a partial plan view on a clamping band, on an enlarged scale, and illustrating a simple method of providing reinforcements within the area of the abutment surface in a guide hook as shown in FIGS. 16 and 17.
Figure 19:
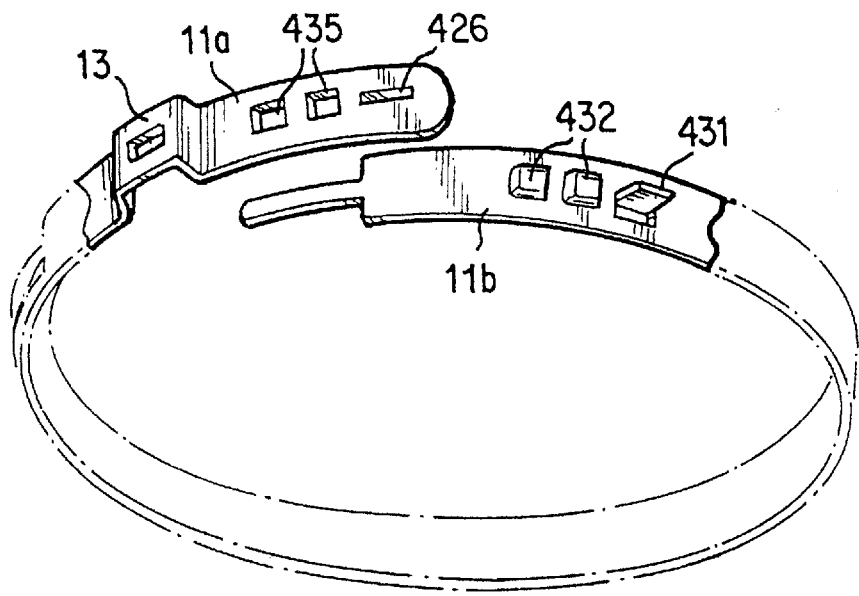
FIGS. 19 and 20 are a perspective view and a partial cross-sectional view, respectively, of a mechanical connection with two support hooks and a so-called combined guide and support hook, as disclosed in U.S. Pat. No. 4,622,720.
Figure 20:
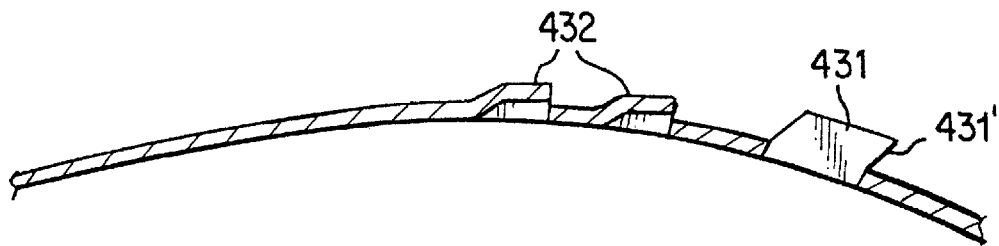

As a guide hook is normally rather small in width and length and therefore may involve difficulties in manufacturing the abutment surface by deep-drawing, FIG. 16 illustrates a modified preferred embodiment in which the guide hook generally designated by reference numeral 321 itself provides directly the abutment surface 351. This is achieved by bending the guide hook 321 two times to provide three sections 321a, 321b and 321c. The innermost section 321a thereby extends outwardly, preferably in the usual oblique direction and is adjoined by a bent center section 321b extending in a direction at least approximately parallel to the plane of the outer band portion which in turn is followed by an outer section 321c, preferably substantially parallel to the inner section 321a and possibly bent back (not shown) as explained by reference to FIG. 5. The center section 321b forming the abutment surface 351 may be substantially rectilinear or may also have a slight curvature coplanar with the outer surface of the outer band portion to accommodate the curvature of the clamping band in the preassembled position. Moreover, to provide adequate form rigidity, the guide hook 321 may be provided with one or more reinforcing indentations or embossments 329a and 329b (FIG. 17) that extend at least in the area of the two bends in the guide hook 321. However, as illustrated in FIG. 17, the reinforcing embossments or indentations may also extend from a predetermined part of section 321a over the entire section 321b into a part of section 321c. A single reinforcing indentation or embossment is illustrated in FIG. 17 while two such indentations or embossments, side-by-side, may also be provided if sufficient space exists in which each such indentation or embossment is continuous. These embossments or indentations may be provided on either side of the guide hook 321 and may also be provided on different sides of the sections 321a, 321b and/or 321c. FIG. 18 illustrates schematically the simplicity of manufacture of such embossments or indentations 329' as they may be made at the same time as or even before the cut 321' of U-shape for the guide hook itself while the blank is still in flat condition.

Figure 21:
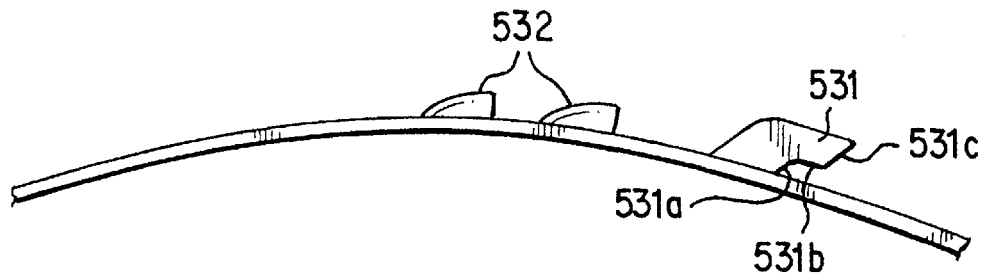
FIG. 21 is a partial cross-sectional view, similar to FIG. 20 and illustrating a combined guide and support hook with an abutment surface according to this invention.

FIG. 21 illustrates a still further embodiment of this invention as applied to a mechanical connection with a so-called combined guide and support hook generally designated by reference numeral 431 and as disclosed in U.S. Pat. No. 4,622,720. The inclined rear guide surface 431' of the prior art combined guide and support hook of this patent, instead of being rectilinear, is then provided with the three-sectional configurations 531a, 531b and 531c (FIG. 21), which can be easily obtained by changing the shape of the cut for making the combined guide and support hook, i.e., by changing the shape of the cut from the parallelogram to a three-sectional zig-zag configuration. The instant invention can thus be applied and realized in a particularly simple manner with such combined guide and support hooks.

The present invention thus provides the significant advantage that the danger of reopening of the clamp is further minimized and that in particular with a clamp having a mechanical connection as shown in FIGS. 4 and 15, immediate absorption of the tightening forces by the support hooks is assured at all times by this invention, starting from the preassembly position. Furthermore, the present invention can be realized by simple manufacturing procedures without substantial increases in costs.

While I have shown and described only several embodiments in accordance with this invention, it is understood that the same is not limited thereto but is susceptible of numerous changes and modifications as known to those skilled in the art. As pointed out, the present invention is particularly applicable to open clamps with a tightening means and a mechanical connection of overlapping band portions involving a guide hook which must be engaged before tightening can begin. Of course, this invention may also be used with so-called earless clamps provided with a guide hook such as guide hook 131 of FIG. 6 to reduce the likelihood of reopening during the final phase of the tightening operation when the guide hook 131 and support hooks 132 are about to engage in their respective apertures 135 by pressing the outer band portion inwardly before releasing the tightening tool. Moreover, to optimize the appropriate shape for the abutment surface 51, 151, 251, 351, the guide hook may also be slightly curved convexly or concavely in transverse cross section. Of course, the reinforcing indentations or embossment may also extend over the full length or over a substantial part of the length of the guide hook. I therefore do not wish to be limited to the details shown and described herein but intend to cover all such changes and modifications as are encompassed by the scope of the appended claims.

I claim:

1. A connection for an open clamp, comprising clamping band means including clamping band portions adapted to overlap in the installed position, tightening means for tightening the clamp about an object to be fastened thereby, connecting means for connecting overlapping band portions including at least one hook-shaped means performing a guide function during tightening of the clamp and extending outwardly from the inner band portion, said hook-shaped means being operable to engage in at least one aperture in the outer band portion, and abutment surface means in said hook-shaped means for preventing disengagement of the connecting means during the entire tightening operation.

2. A connection for a clamp according to claim 1, wherein said abutment surface means is operable to limit relative movement of said other band portion in the direction toward the free end of said hook-shaped means.

3. A connection for a clamp according to claim 2, wherein said abutment surface means is formed by a deep-drawn part projecting from said hook-shaped means.

4. A connection for a clamp according to claim 3, wherein said deep-drawn part is partially separated from said hook-shaped means by a cut extending at least in part in a direction substantially transverse to the longitudinal direction of the hook-shaped means.

5. A connection for a clamp according to claim 4, wherein said cut is at least approximately rectilinear.

6. A connection for a clamp according to claim 4, wherein said cut is curvilinear.

7. A connection for a clamp according to claim 4, wherein said abutment surface means is provided with an anchoring means in the center area of the cut.

8. A connection for a clamp according to claim 7, wherein said anchoring means is a projection adapted to engage in one of indentation and opening in said outer band portion.

9. A connection for a clamp according to claim 1, wherein said hook-shaped means is a guide hook bent out of the inner clamping band portion after a substantial U-shaped cut in said clamping band means.

10. A connection for a clamp according to claim 1, wherein the inner clamping band portion is further provided with at least one cold-deformed and deep-drawn support hook means, said support hook means being operable to engage in at least one further aperture in said outer band portion and forming an abutment surface of predetermined height operable to engage with an edge of said at least one further aperture, and wherein said abutment surface means is so located on said hook-shaped means that upon preassembly of the clamp by engagement of said hook-shaped means in its aperture, the edge of the at least one further aperture is in a plane within the height of said support hook means.

11. A mechanical connection for open clamps according to claim 1, wherein said abutment surface means is formed directly by a bent section in said hook-shaped means.

12. A mechanical connection for open clamps according to claim 11, wherein said bent section extends at least approximately parallel to the clamping band means in its flat condition.

13. A mechanical connection for open clamps according to claim 11, further comprising reinforcing means in said hook-shaped means at least within the area of bends forming said bent section.

14. A mechanical connection for open clamps according to claim 13, wherein said reinforcing means is formed by at least one of reinforcing indentation and embossment.

15. A clamp, comprising clamping band means having clamping band portions adapted to overlap in the installed position, connecting means for connecting overlapping band portions, tightening means for securing the clamp about an object to be fastened thereby, said connecting means including at least one outwardly extending hook-shaped member in the inner of said overlapping band portions adapted to engage in at least one aperture in the outer of said overlapping band portions, and preassembly means in said hook-shaped member forming an abutment surface means for the outer band portion to lessen the likelihood of disengagement of the connecting means during the entire tightening operation by said tightening means.

16. A clamp according to claim 15, wherein said tightening means includes a plastically deformable ear having two outwardly extending leg portions interconnected by a bridging portion.

17. A clamp according to claim 16, wherein said abutment surface means is formed by at least one of deep-drawing and bending.

18. A clamp according to claim 15, wherein said hook-shaped member forms part of the connecting means connecting the overlapping band portions in the fully tightened condition of the clamp.

19. A clamp according to claim 1, wherein said hook-shaped means is a combined guide and support hook extending substantially in the longitudinal direction of the clamping band means and having an oblique outwardly extending rear surface, and wherein said abutment surface means is formed in said rear surface.

20. A clamp according to claim 19, wherein said abutment surface means is formed by a cut having an outer section, an inner section and a center section joining said inner and outer sections and angularly disposed relative to said inner and outer sections.

21. A clamp according to claim 20, wherein said center section extends at least approximately parallel to the surface of the outer band portion while both the inner and outer sections extend outwardly.

22. A clamp according to claim 21, wherein at least the outer section extends obliquely outwardly.

23. A clamp according to claim 22, wherein said inner and outer sections extend outwardly substantially parallel to one another.

24. A method for manufacturing a so-called open clamp having band portions intended to overlap and provided with a mechanical connection including at least one guide hook, comprising the steps of cutting a flat blank of predetermined length, making a substantially U-shaped cut of a shape corresponding in length to the guide hook, and thereafter bending said guide hook twice in such a manner as to form an inner section extending obliquely outwardly, a center section extending at least approximately parallel to the clamping band in its flat condition, and an outer section extending obliquely outwardly.

25. A method according to claim 24, further comprising the step of providing at least one reinforcement in the form of an indentation or embossment in a predetermined area of the guide hook before the bending step.

\* \* \* \* \*